United States Patent [19]
Uwabo et al.

[11] Patent Number: 5,953,187
[45] Date of Patent: Sep. 14, 1999

[54] HIGH-DENSITY FLEXIBLE DISK DRIVE HAVING A FUNCTION OF FACILITATING CORRECT INSERTION OF A LARGE-CAPACITY FLEXIBLE DISK THEREINTO WITHOUT AN INSERTION ERROR

[75] Inventors: Tsuneo Uwabo; Yoshihiro Okano; Eiichi Yoneyama; Yoshinori Tangi, all of Atsugi, Japan

[73] Assignee: Mitsumi Electric Co., Ltd., Tokyo, Japan

[21] Appl. No.: 08/792,433

[22] Filed: Jan. 30, 1997

[30] Foreign Application Priority Data

| Jan. 31, 1996 | [JP] | Japan | 8-016140 |
| Feb. 6, 1996 | [JP] | Japan | 8-019621 |
| May 24, 1996 | [JP] | Japan | 8-130392 |

[51] Int. Cl.$^6$ .................................................. G11B 23/033
[52] U.S. Cl. ................................ 360/133; 369/291
[58] Field of Search ........................ 360/97.01, 99.01, 360/99.02, 99.03, 99.06, 99.07, 133; 369/75.1, 75.2, 77.1, 77.2, 291

[56] References Cited

U.S. PATENT DOCUMENTS

| 5,422,775 | 6/1995 | Martin | 360/133 |
| 5,502,704 | 3/1996 | Ohmori | 369/77.2 |
| 5,691,860 | 11/1997 | Hoppe | 360/97.02 |

FOREIGN PATENT DOCUMENTS

| 62-184678 | 8/1987 | Japan | 360/133 |

*Primary Examiner*—Jefferson Evans
*Attorney, Agent, or Firm*—Frishauf, Holtz, Goodman, Langer & Chick, P.C.

[57] ABSTRACT

In a high-density flexible disk drive, a color of at least a surface of a cover (22) (in addition, a color of at least a surface of an eject button (30)) is different from that of at least a surface of a body of a front panel (20). A user can visually distinguish the high-density flexible disk drive from a normal-density dedicated flexible disk drive in which a color of a surface of a cover is identical with that of a surface of a body of a front panel. Thus, a large-capacity flexible disk can be correctly inserted into the high-density flexible disk drive without being erroneously inserted into the normal-density dedicated flexible disk drive.

4 Claims, 8 Drawing Sheets

HIGH-DENSITY FLEXIBLE DISK DRIVE HAVING A FUNCTION OF FACILITATING CORRECT INSERTION OF A LARGE-CAPACITY FLEXIBLE DISK THEREINTO WITHOUT AN INSERTION ERROR

BACKGROUND OF THE INVENTION

This invention relates to a flexible disk drive for driving a flexible disk and, in particular, to a high-density flexible disk drive capable of driving a large-capacity flexible disk. This invention also relates to a large-capacity flexible disk to be inserted into the high-density flexible disk drive.

As well known, a flexible disk drive is a device for carrying out data recording and reproducing operations to and from a flexible disk inserted therein. In recent years, the flexible disk is more and more improved to have a greater capacity. Specifically, development is made of a large-capacity flexible disk having a storage capacity as large as 128 Mbytes in contrast with a normal-capacity flexible disk having a storage capacity between 1 Mbyte and 2 Mbytes. Following such development, the flexible disk drive is also improved to accept the large-capacity flexible disk for data recording and reproducing operations to and from the large-capacity flexible disk.

Throughout the present specification, a flexible disk drive capable of carrying out data recording and reproducing operations to and from the large-capacity flexible disk alone will be referred to as a high-density dedicated flexible disk drive. On the other hand, a flexible disk drive capable of carrying out data recording and reproducing operations to and from the normal-capacity flexible disk alone will be called a normal-density dedicated flexible disk drive. A flexible disk drive capable of carrying out data recording and reproducing operations to and from both the large-capacity and the normal-capacity flexible disks will be called a high-density/normal-density flexible disk drive. The high-density dedicated flexible disk drive and the high-density/normal-density flexible disk drive will collectively be called a high-density flexible disk drive.

The normal-density dedicated flexible disk drive and the high-density flexible disk drive are different in mechanism from each other in several respects, one of which will presently be described. In either flexible disk drive, a magnetic head is supported by a carriage which is driven by a drive unit to move in a predetermined radial direction with respect to the flexible disk inserted into the flexible disk drive. The difference resides in the structure of the drive unit. Specifically, the normal-density dedicated flexible disk drive uses a stepping motor as the drive unit. On the other hand, the high-density flexible disk drive uses a linear motor such as a voice coil motor (VCM) as the drive unit.

Now, description will be made in detail as regards the voice coil motor used as the drive unit in the high-density flexible disk drive. The voice coil motor comprises a voice coil arranged at a rear side of the carriage and wound around a drive shaft extending in parallel to the predetermined radial direction, and a magnetic circuit for producing a magnetic field in a direction intersecting that of an electric current flowing through the voice coil. With this structure, when the electric current is made to flow through the voice coil in a direction intersecting that of the magnetic field produced by the magnetic circuit, a drive force is generated in an extending direction of the drive shaft as a result of an interaction between the electric current and the magnetic field. By the use of the drive force, the voice coil motor makes the carriage move in the predetermined radial direction.

In the meanwhile, the large-capacity flexible disk generally has an external configuration identical with that of the normal-capacity flexible disk. Specifically, both of the large-capacity and the normal-capacity flexible disks have a flat rectangular shape of a width of 90 mm, a length of 94 mm, and a thickness of 3.3 mm in case of a 3.5-inch type.

It is therefore possible to insert the large-capacity flexible disk into the normal-density dedicated flexible disk drive. Even if the large-capacity flexible disk is erroneously inserted into the normal-density dedicated flexible disk drive, a data writing operation is impossible because a write protect function is activated in a circuit operation.

In such an event, however, the magnetic head of the normal-density dedicated flexible disk drive carries out a loading operation with the magnetic head brought into contact with a magnetic medium of the large-capacity flexible disk although the data writing operation is inhibited as described above. At this time, dust is unavoidably adhered onto the magnetic disk medium of the large-capacity flexible disk from the magnetic head. When the large-capacity flexible disk with the dust adhered to the magnetic disk medium is removed from the normal-density dedicated flexible disk drive and inserted into the high-density flexible disk drive, the magnetic head of the high-density flexible disk drive and the magnetic disk medium may possibly be damaged.

On the contrary, the normal-capacity flexible disk can be inserted into the high-density dedicated flexible disk drive. The high-density dedicated flexible disk drive can not judge whether or not a flexible disk inserted therein is the normal-capacity flexible disk or the large-capacity flexible disk until the flexible disk is accessed. When it is judged that the flexible disk is the normal-capacity flexible disk, the normal-capacity flexible disk must be removed from the high-density dedicated flexible disk drive.

SUMMARY OF THE INVENTION

It is therefore a first object of this invention to provide a high-density flexible disk drive which can be easily distinguished from a normal-density dedicated flexible disk drive so that a large-capacity flexible disk is correctly inserted into the high-density flexible disk drive without being erroneously inserted into the normal-density dedicated flexible disk drive.

It is a second object of this invention to provide a large-capacity flexible disk which has an insertion error inhibit structure inhibiting erroneous insertion into a normal-density dedicated flexible disk drive.

It is a third object of this invention to provide a high-density flexible disk drive which allows insertion of a large-capacity flexible disk having an insertion error inhibit structure.

It is a fourth object of this invention to provide a large-capacity flexible disk which can be inserted into a high-density dedicated flexible disk drive having an insertion error inhibit structure inhibiting erroneous insertion of a normal-capacity flexible disk.

It is a fifth object of this invention to provide a high-density dedicated flexible disk drive which has an insertion error inhibit structure inhibiting erroneous insertion of a normal-capacity flexible disk.

It is a sixth object of this invention to provide a high-density/normal-density flexible disk drive which allows insertion of a large-capacity flexible disk having an insertion error inhibit structure inhibiting erroneous insertion into a normal-density dedicated flexible disk drive.

A high-density flexible disk drive to which this invention is applicable is for use in driving a large-capacity flexible disk and comprises a front panel arranged at a front side of the high-density flexible disk drive. The front panel comprises a panel body, a slot formed in the panel body for insertion of the large-capacity flexible disk, and a cover attached to the panel body for closing and opening the slot. According to a first aspect of this invention, the front panel further comprises identifying means enabling visual distinguishment of the high-density flexible disk drive from a normal-density dedicated flexible disk drive for exclusively driving a normal-capacity flexible disk.

A large-capacity flexible disk to which this invention is applicable is adapted to be inserted into a high-density flexible disk drive and comprises a case containing a magnetic disk medium. According to a second aspect of this invention, the case has a pair of projecting portions which are formed at a rear portion of the case in an insertion direction of inserting the large-capacity flexible disk into the high-density flexible disk drive and which laterally outwardly extend from both lateral sides of the case.

A high-density flexible disk drive to which this invention is applicable is for insertion of a large-capacity flexible disk comprising a case containing a magnetic disk medium. The case has a pair of projecting portions which are formed at a rear portion of the case in an insertion direction of inserting the large-capacity flexible disk into the high-density flexible disk drive and which laterally outwardly extend from both lateral sides of the case. According to a third aspect of this invention, the high-density flexible disk drive has a front panel arranged at a front side thereof. The front panel has a slot of a width sufficient to insert the large-capacity flexible disk having the case provided with the projecting portions.

A large-capacity flexible disk to which this invention is applicable is adapted to be inserted into a high-density dedicated flexible disk drive and comprises a case containing a magnetic disk medium. According to a fourth aspect of this invention, the case has a first notch formed on a forward side of the case in an insertion direction of inserting the large-capacity flexible disk into the high-density dedicated flexible disk drive.

A high-density dedicated flexible disk drive to which this invention is applicable is for insertion of a large-capacity flexible disk. The large-capacity flexible disk comprises a case containing a magnetic disk medium. The case has a notch formed on a forward side of the case in an insertion direction of inserting the large-capacity flexible disk into the high-density dedicated flexible disk drive. According to a fifth aspect of this invention, the high-density dedicated flexible disk drive comprises a disk holder unit for holding the large-capacity flexible disk when it is inserted into the high-density dedicated flexible disk drive. The disk holder unit has a protrusion formed at a position corresponding to the notch of the large-capacity flexible disk held by the disk holder unit.

A high-density/normal-density flexible disk drive to which this invention is applicable is for insertion of a large-capacity flexible disk. The large-capacity flexible disk comprises a case containing a magnetic disk medium. The case has a notch formed on a lateral side provided with a chamfered portion for preventing reverse insertion of the large-capacity flexible disk. The notch has a particular shape and is formed at a particular position so that the notch is engaged by a reverse insertion preventing lever of a normal-density dedicated flexible disk drive. According to a sixth aspect of this invention, the high-density/normal-density flexible disk drive comprises a disk holder unit for holding the large-capacity flexible disk when it is inserted into the high-density/normal-density flexible disk drive. The disk holder unit has a recess formed at a position corresponding to the notch and extending in a direction perpendicular to an insertion direction of inserting the large-capacity flexible disk, and a reverse insertion preventing lever formed at the recess to be movable in a releasing direction of being released from the recess upon collision by the chamfered portion.

DESCRIPTION OF THE PREFERRED EMBODIMENT

Figure 1:
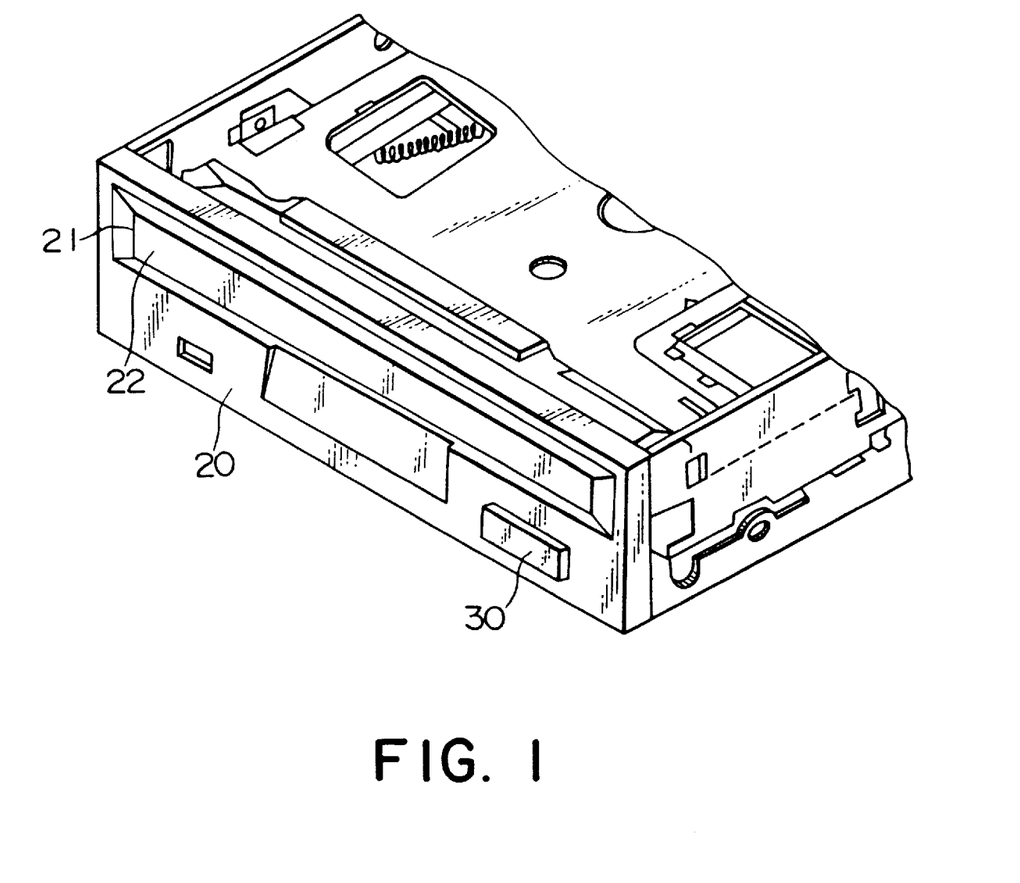
FIG. 1 is a perspective view of a main portion of a high-density flexible disk drive according to a first embodiment of this invention.

Referring to FIG. 1, a high-density flexible disk drive according to a first embodiment of this invention has a front panel 20 arranged at a front side of the high-density flexible disk drive. The front panel 20 comprises a panel body, a slot 21 formed in the panel body for insertion of a large-capacity flexible disk into the high-density flexible disk drive, a cover 22 attached to the panel body for closing and opening the slot 21, and an eject button 30 for ejecting the large-capacity flexible disk from the high-density flexible disk drive. The high-density flexible disk drive is for driving the large-capacity flexible disk inserted therein.

The eject button 30 protrudes from the front panel 20 to be depressible. When the eject button 30 is pushed, the large-capacity flexible disk received in the high-density flexible disk drive is ejected by an eject mechanism which is not shown in the figure.

Figure 2:
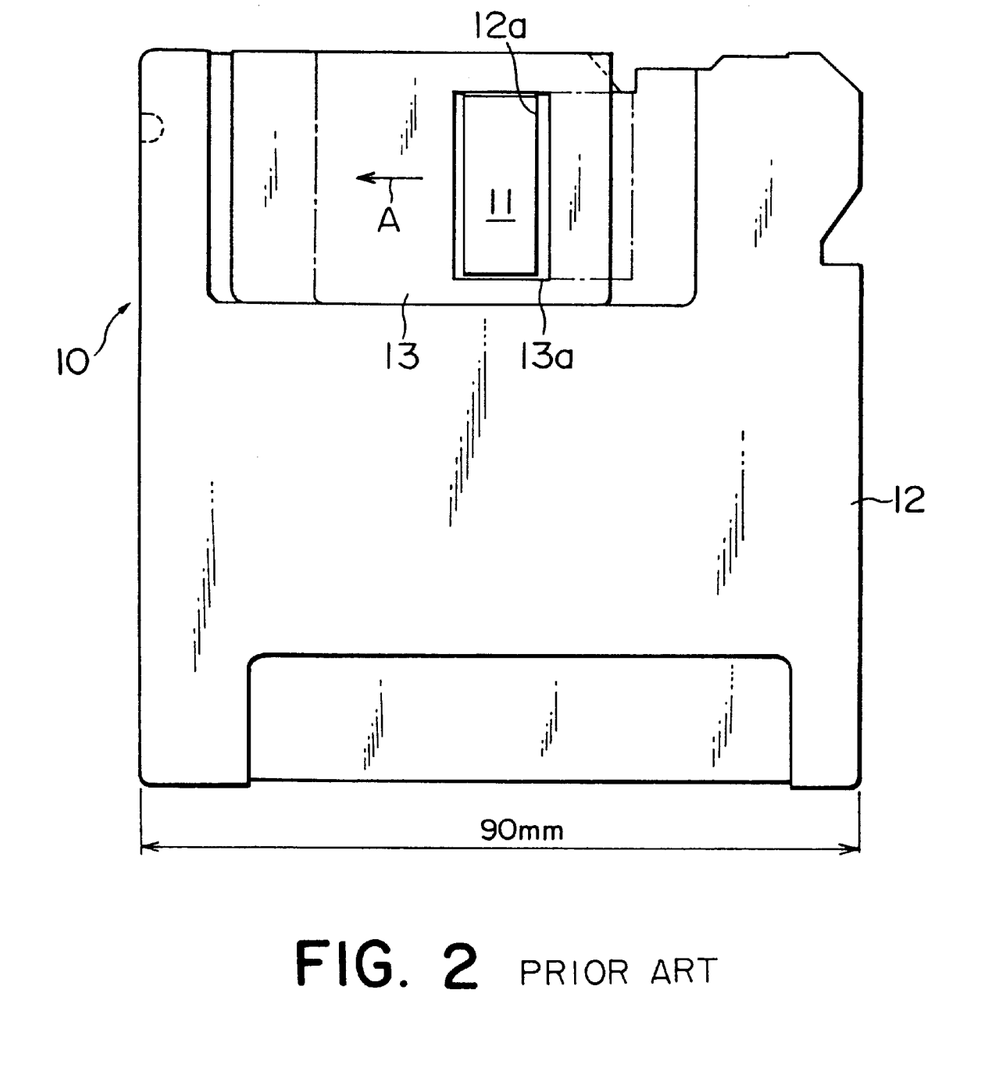
FIG. 2 is a plan view of a conventional large-capacity flexible disk to be inserted into the high-density flexible disk drive illustrated in FIG. 1.

Referring to FIG. 2, a conventional large-capacity flexible disk is represented by a reference numeral 10. The large-capacity flexible disk 10 illustrated in the figure shows a state when it is inserted into the high-density flexible disk drive in FIG. 1.

The large-capacity flexible disk 10 comprises a disk-shaped magnetic disk medium 11, a case 12 covering the magnetic disk medium 11, and a shutter 13 slidable in a direction depicted at A in the figure. The shutter 13 is provided with a window 13a. The shutter 13 is urged by a spring member (not shown) in a direction opposite to the direction A. When the shutter 13 is slid in the direction A, the window 13a of the shutter 13 is positioned at an opening 12a of the case 12. In this event, the magnetic disk medium 11 can be accessed through the opening 12a by a magnetic head (not shown) of the high-density flexible disk drive in FIG. 1.

As mentioned in the preamble of the specification, the case 12 of the large-capacity flexible disk 10 has a flat rectangular shape of a width of 90 mm, a length of 94 mm, and a thickness of 3.3 mm. The above-mentioned size of the case 12 of the large-capacity flexible disk 10 is generally equal to that of a case of a normal-capacity flexible disk.

Referring back to FIG. 1, the slot 21 of the high-density flexible disk drive has a dimension sufficient to insert the large-capacity flexible disk 10. In the meanwhile, a slot of a normal-density dedicated flexible disk drive also has a dimension substantially equal to that of the slot 21 of the high-density flexible disk drive in order to insert the normal-capacity flexible disk equal in size to the large-capacity flexible disk 10.

In the high-density flexible disk drive, the cover 22 has a surface different in color from a surface of the panel body of the front panel 20. Therefore, it is possible for a user to visually distinguish the high-density flexible disk drive from the normal-density dedicated flexible disk drive in which a surface of a cover is same in color as that of the panel body of the front panel. For example, when the surface of the panel body of the front panel 20 is gray, the surface of the cover 22 may be green, red, or any other color different from gray.

In addition to the color of the surface of the cover 22, a surface of the eject button 30 may be different in color from that of the panel body of the front panel 20. In this case, the surface of the eject button 30 may have a color different from or identical with that of the surface of the cover 22.

It is essential that at least the surface of the cover 22 or the eject button 30 is different in color from at least the surface of the panel body of the front panel 20. For example, the whole of the cover 22 or the eject button 30 may be different in color from the whole of the front panel 20.

As will be clear from the foregoing description, the high-density flexible disk drive according to the first embodiment of this invention has, at the front panel, identifying means for enabling visual distinguishment of the high-density flexible disk drive from the normal-density dedicated flexible disk drive. Accordingly, it is possible for a user to correctly insert the large-capacity flexible disk into the high-density flexible disk drive. In particular, the high-density flexible disk drive can be easily identified because at least the surface of the cover (additionally, at least the surface of the eject button) is different in color from at least the surface of the panel body of the front panel. Thus, the user can correctly insert the large-capacity flexible disk into the high-density flexible disk drive.

Figure 3:
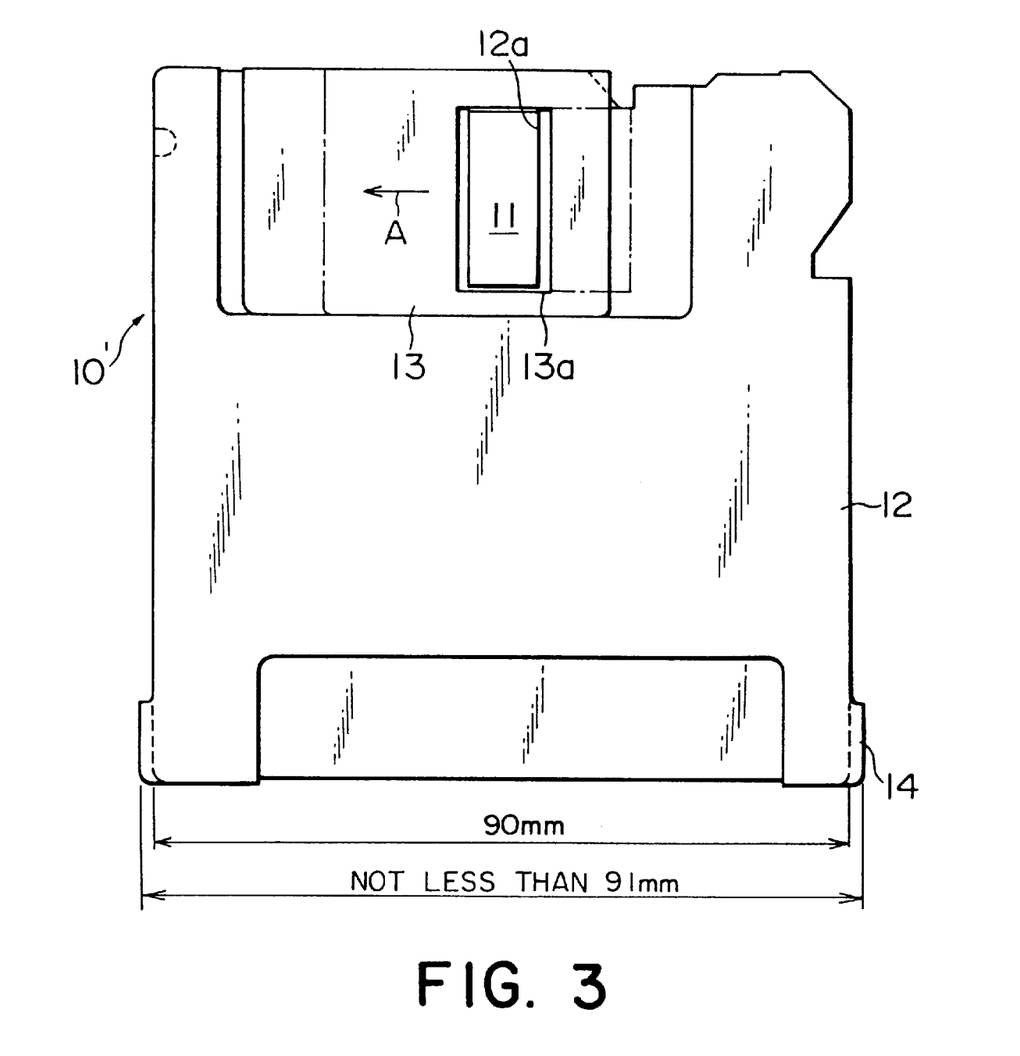
FIG. 3 is a plan view of a large-capacity flexible disk according to a second embodiment of this invention.

Referring to FIG. 3, a large-capacity flexible disk 10' according to a second embodiment of this invention is illustrated in a state when it is inserted into a high-density flexible disk drive which will later be described in conjunction with FIG. 4.

The large-capacity flexible disk 10' is different from the large-capacity flexible disk 10 in FIG. 2 and a conventional large-capacity flexible disk in the following respect. Specifically, the case 12 of the large-capacity flexible disk 10' has a pair of projecting portions 14 which are formed at a rear portion of the case 12 in an insertion direction of inserting the large-capacity flexible disk 10' into the high-density flexible disk drive and which laterally outwardly extend from both lateral sides of the case 12. In other words, a case of the conventional large-capacity flexible disk does not have such projecting portions 14, as depicted by broken lines in FIG. 3. The case 12 has a width of 91 mm or more, including the projecting portions 14. The projecting portions 14 serve as an insertion error inhibit structure.

Figure 4:
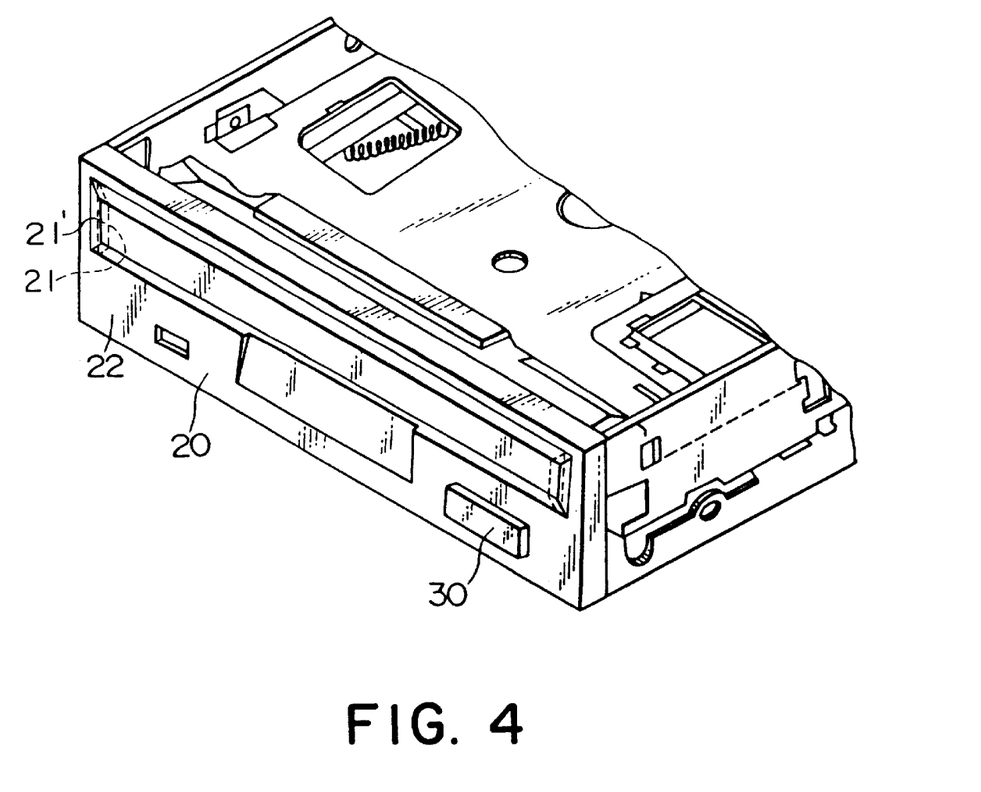
FIG. 4 is a perspective view of a main portion of a high-density flexible disk drive capable of inserting the large-capacity flexible disk illustrated in FIG. 3.

Referring to FIG. 4, the high-density flexible disk drive illustrated in the figure is adapted to insert the large-capacity flexible disk illustrated in FIG. 3. In the high-density flexible disk drive, a slot 21' of the front panel 20 has a width sufficient to insert the large-capacity flexible disk in FIG. 3 having a width of 91 mm or more. Thus, in order to insert the large-capacity flexible disk in FIG. 3, the slot 21' of the high-density flexible disk drive is wider than that of a conventional high-density flexible disk drive and the slot 21 (depicted by broken lines in FIG. 4) of the high-density flexible disk drive in FIG. 2.

The normal-density dedicated flexible disk drive also has the slot of a width allowing insertion of those flexible disks having a width of 90 mm, as depicted by the broken lines in FIG. 4. Accordingly, the flexible disks without the projecting portions 14 as depicted by the broken lines in FIG. 3 can be inserted while the large-capacity flexible disk 10' of this invention (FIG. 3) can not be inserted. This is because the projecting portions 14 can not pass through the slot of the normal-density dedicated flexible disk drive. As a result, the large-capacity flexible disk 10' can not be inserted inward any further.

As mentioned above, the large-capacity flexible disk 10' is inhibited from insertion into the normal-density dedicated flexible disk drive. Accordingly, it is possible to prevent the magnetic head of the high-density flexible disk drive or the magnetic disk medium 11 of the large-capacity flexible disk 10' from being damaged by dust adhered to the magnetic disk medium 11 as a result of erroneous insertion into the normal-density dedicated flexible disk drive.

Figure 5:
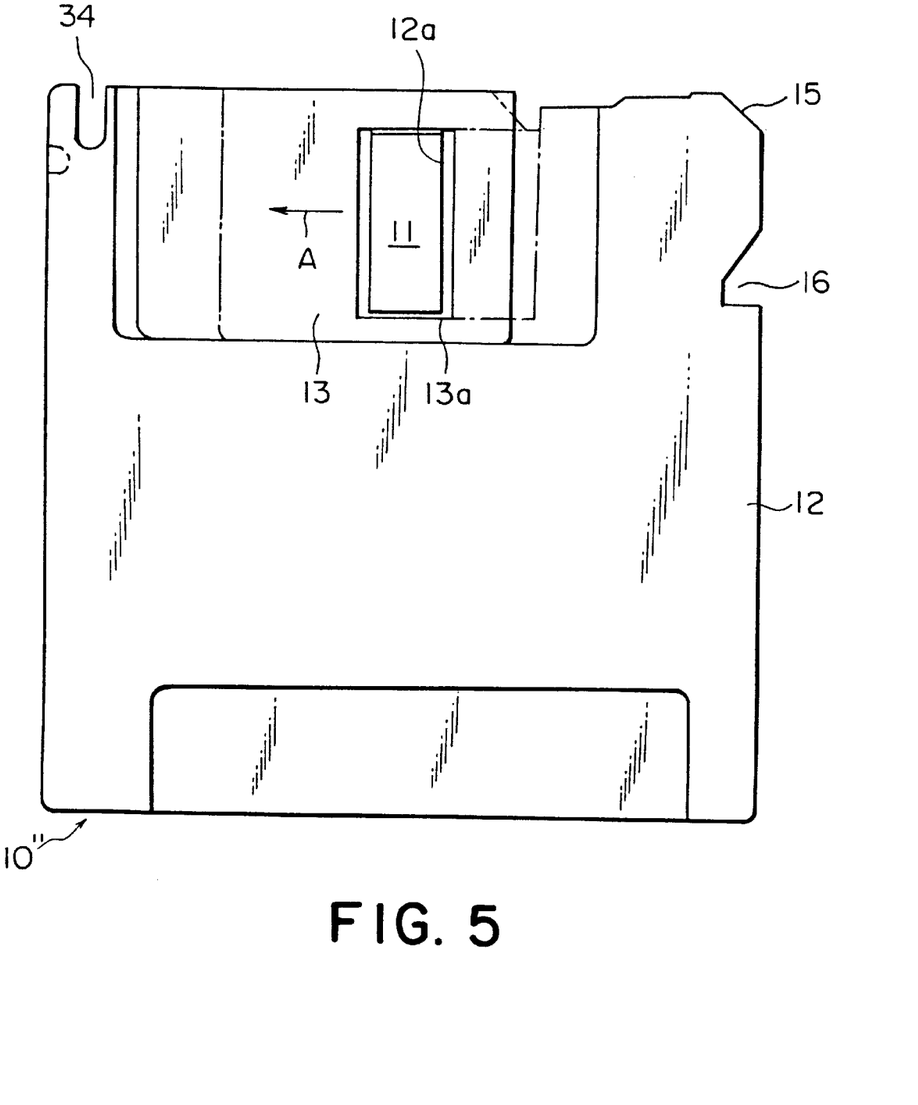
FIG. 5 is a plan view of a large-capacity flexible disk according to a third embodiment of this invention.

Referring to FIG. 5, a large-capacity flexible disk 10" according to a third embodiment of this invention is illustrated in a state when it is inserted into a high-density dedicated flexible disk drive or a high-density/normal-density flexible disk drive which will later be described. The large-capacity flexible disk 10" comprises similar parts designated by like reference numerals.

The large-capacity flexible disk 10" has a case 12 different from that of the conventional large-capacity flexible disk in the following respects. Specifically, the case 12 has a first notch 34 formed on a forward side of the case 12 in the insertion direction, and a second notch 16 formed on a lateral side provided with a chamfered portion 15 for preventing reverse insertion (wrong insertion in a vertical direction or in the insertion direction). The second notch 16 has a particular shape and is formed at a particular position so that the second notch 16 is engaged by a reverse insertion preventing lever of the normal-density dedicated flexible disk drive. In other words, the case of the conventional large-capacity flexible disk does not have the first and the second notches 34 and 16.

Figure 6:
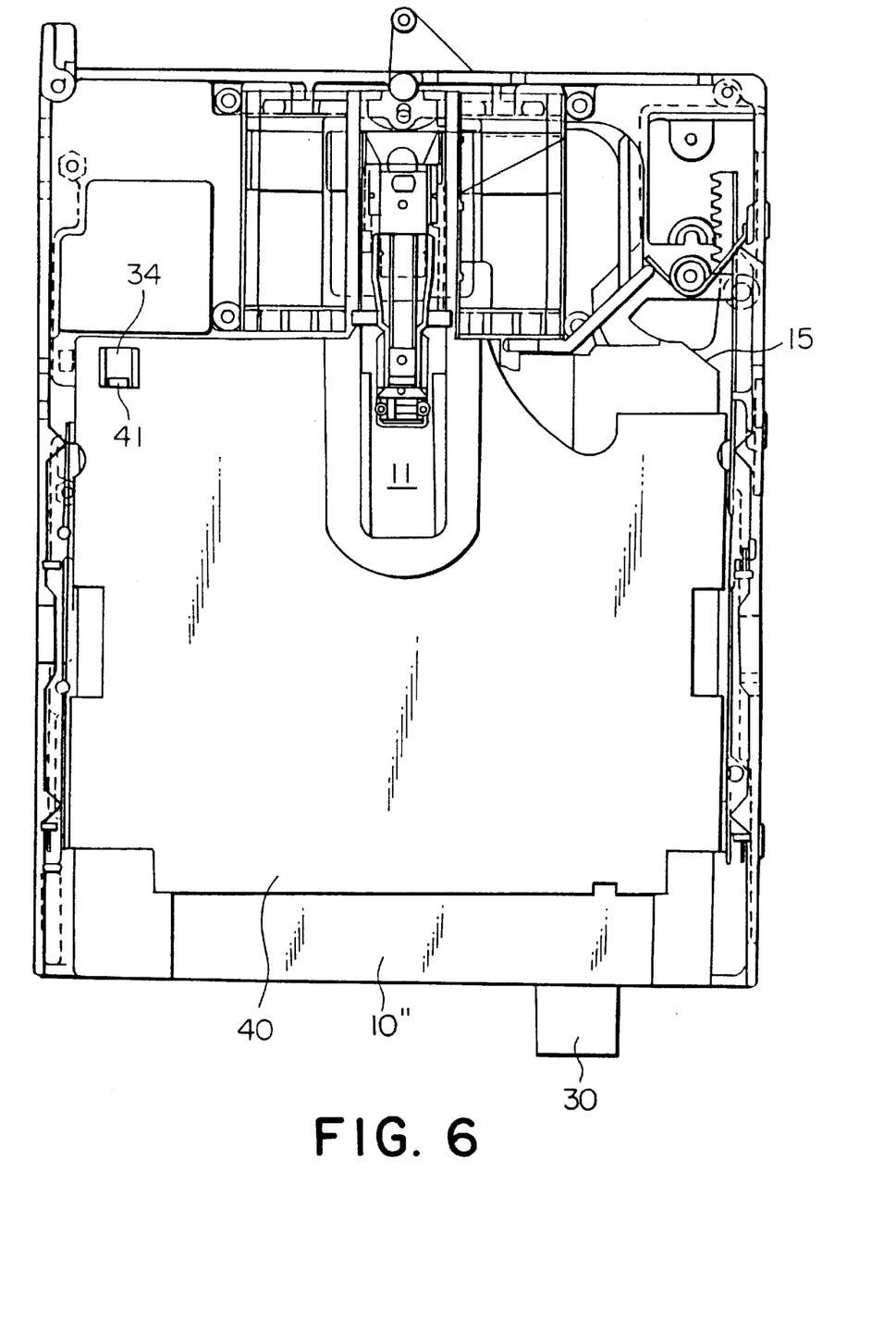
FIG. 6 is a plan view of a high-density dedicated flexible disk drive capable of inserting the large-capacity flexible disk illustrated in FIG. 5.

Referring to FIG. 6, the high-density dedicated flexible disk drive is adapted to insert the large-capacity flexible disk 10" illustrated in FIG. 5. The high-density dedicated flexible disk drive has a disk holder unit 40 for holding the large-capacity flexible disk 10". The disk holder unit 40 has a protrusion (stopper) 41 formed at a position corresponding to the first notch 34 (FIG. 5).

Since the normal-capacity flexible disk does not have the first notch 34 illustrated in FIG. 5, the normal-capacity flexible disk can not be inserted into the high-density dedicated flexible disk drive illustrated in FIG. 6. This is because the normal-density flexible disk collides with the protrusion 41 and can not be inserted inward any further.

As mentioned above, the normal-capacity flexible disk is inhibited from insertion into the high-density dedicated flexible disk drive. Therefore, it is unnecessary to eject the normal-capacity flexible disk erroneously inserted into the high-density dedicated flexible disk drive by pushing the eject button 30.

Figure 7:
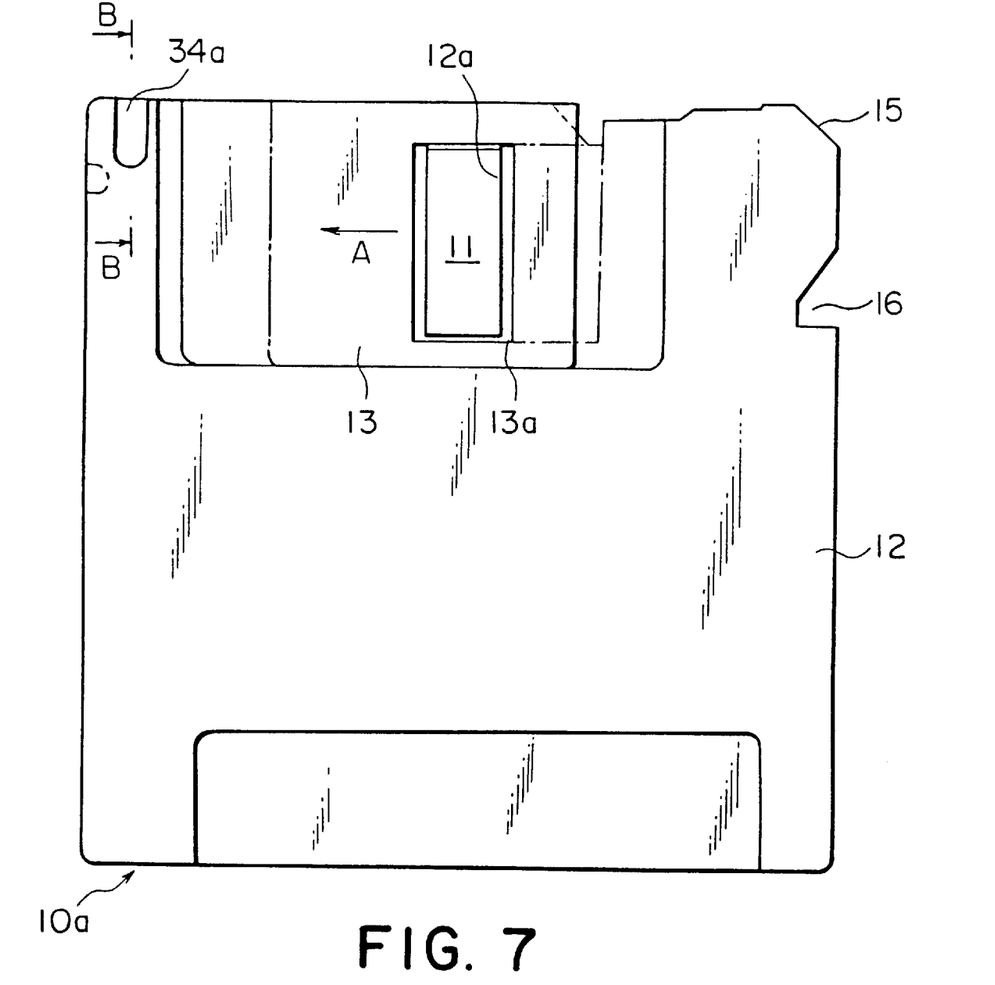
FIG. 7 is a plan view of a large-capacity flexible disk according to a fourth embodiment of this invention.
Figure 8:
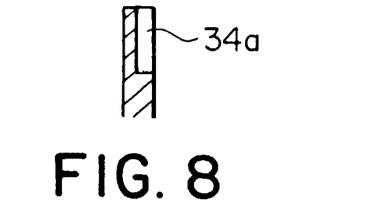
FIG. 8 is a sectional view taken along a line B—B in FIG. 7.

Referring to FIGS. 7 and 8, a large-capacity flexible disk 10*a* according to a fourth embodiment of this invention is substantially similar in structure to that of the large-capacity flexible disk 10" in FIG. 5 except that the first notch 34*a* is formed at an upper surface of the case 12 alone.

The large-capacity flexible disk 10*a* can also be inserted into the high-density dedicated flexible disk drive illustrated in FIG. 6.

Figure 9:
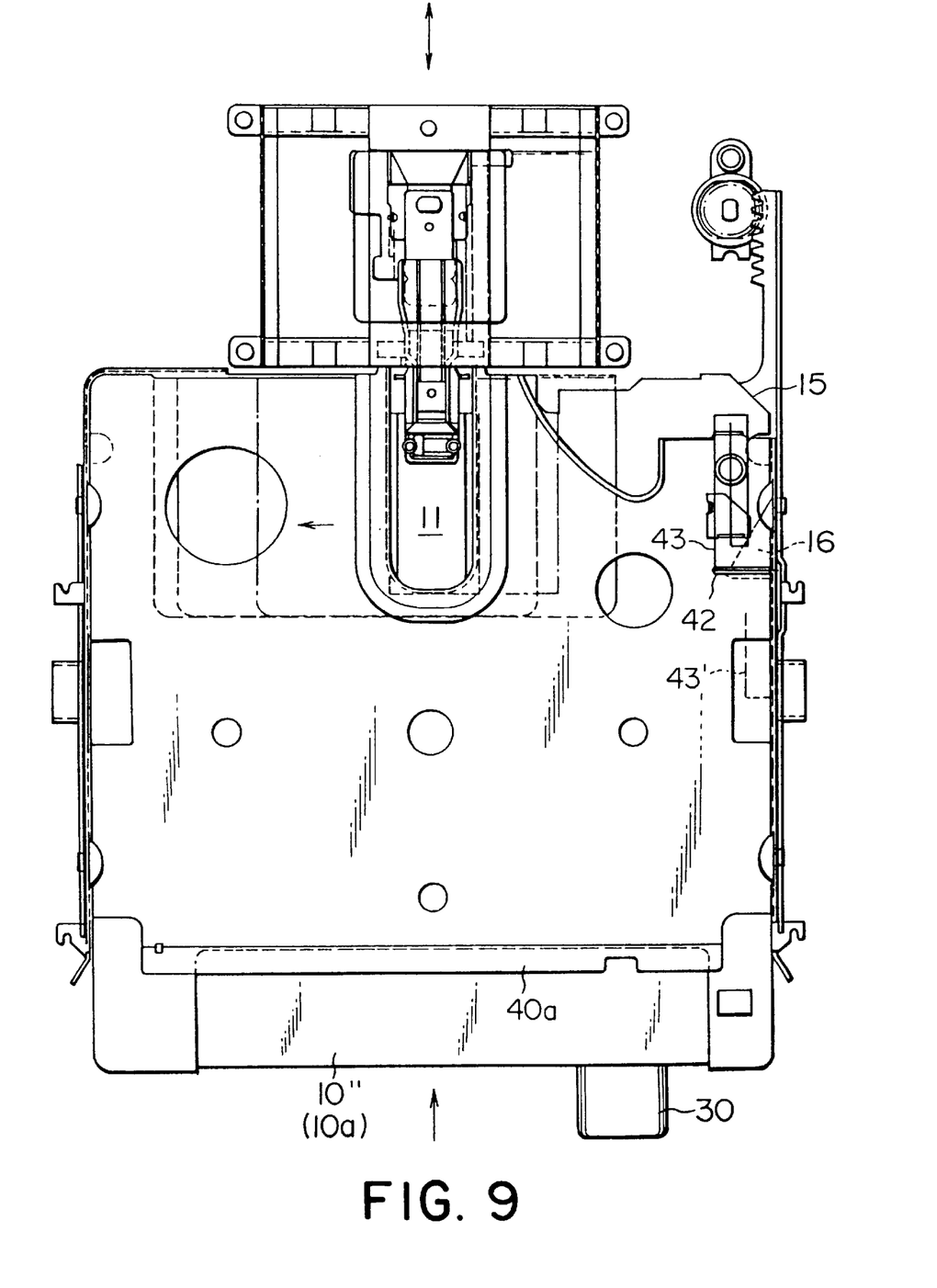
FIG. 9 is a plan view of a high-density/normal-density flexible disk drive capable of inserting the large-capacity flexible disk illustrated in each of FIGS. 5 and 7.

Referring to FIG. 9, the high-density/normal-density flexible disk drive is adapted to insert the large-capacity flexible disk 10" or 10*a* illustrated in FIG. 5 or 7.

The high-density/normal-density flexible disk drive illustrated in the figure has a disk holder unit 40*a* for holding the large-capacity flexible disk 10" or 10*a*. The disk holder unit 40*a* has a recess 42 formed at a position corresponding to the second notch 16 and extending in a direction perpendicular to the insertion direction of inserting the large-capacity flexible disk 10" or 10*a*. The recess 42 is provided with a reverse insertion preventing lever 43. The reverse insertion preventing lever 43 is arranged to be movable in a releasing direction of being released from the recess 22 upon collision by the chamfered portion 15. In the illustrated example, the reverse insertion preventing lever 23 is moved rightward in the figure when the chamfered portion 15 collides with the reverse insertion preventing lever 23.

Accordingly, both the large-capacity flexible disk 10" or 10*a* illustrated in FIG. 5 or 7 and the normal-capacity flexible disk can be inserted into the high-density/normal-density flexible disk drive of the above-mentioned structure.

In FIG. 9, the reverse insertion preventing lever of the normal-density dedicated flexible disk drive is depicted at 43' by a broken line. Because of presence of the reverse insertion preventing lever 43' at a position illustrated in the figure, the large-capacity flexible disk 10" or 10*a* can not be inserted into the normal-density dedicated flexible disk drive. This is because the reverse insertion preventing lever 43' is engaged in the second notch 16 so that the large-capacity flexible disk 10" or 10*a* can not be inserted inward any further.

What is claimed is:

1. A large-capacity flexible disk adapted for insertion into a high-density flexible disk drive, said disk comprising a case containing a magnetic disk medium, said case having first and second surfaces and a pair of projecting portions formed only at a rear portion of said case in an insertion direction of inserting said large-capacity flexible disk into said high-density flexible disk drive, said pair of projecting portions laterally outwardly extending from both lateral sides of said case, wherein the projecting portions include first and second surfaces, wherein the first and second surfaces of the large-capacity flexible disk are contiguous with the first and the second surfaces of the projecting portions, and wherein said projecting portions prevent insertion of the large capacity flexible disk into a normal density dedicated flexible disk drive while allowing insertion of the large capacity flexible disk into said high den flexible disk drive.

2. A large-capacity flexible disk adapted to be inserted into a high-density flexible disk drive, said disk comprising a case containing a magnetic disk medium, said case having a pair of projecting portions formed at a rear portion of said case in an insertion direction of inserting said large-capacity flexible disk into said high-density disk drive, said pair of projecting portions laterally outwardly extending from both lateral sides of said case, said case having a first width which includes said projecting portions at said rear portion measuring at least 91 mm, said case having a second width at a remaining portion at which said projecting portions are not formed being equal to 90 mm, said projecting portions preventing insertion of said large-capacity flexible disk into a normal-density dedicated flexible disk drive and enabling insertion of said large-capacity flexible disk into said high-density flexible disk drive.

3. A large-capacity flexible disk adapted for insertion into a high-density flexible disk drive, said disk comprising a case containing a magnetic disk medium, said case having a pair of projecting portions formed at a rear portion of said case in an insertion direction of inserting said large-capacity flexible disk into said high-density flexible disk drive, said pair of projecting portions laterally outwardly extending from both lateral sides of said case, said case having a first width which includes said projecting portions at said rear portion measuring at least 91 mm, and a second width at a remaining portion at which said projecting portions are not formed being equal to 90 mm, and wherein said projecting portions prevent insertion of the large capacity flexible disk into a normal density dedicated flexible disk drive while allowing insertion of the large capacity flexible disk into said high density flexible disk drive.

4. A large-capacity flexible disk adapted for insertion into a high-density flexible disk drive, said disk comprising a case containing a magnetic disk medium, said case having first and second surfaces and a pair of projecting portions formed at a rear portion of said case in an insertion direction of inserting said large-capacity flexible disk into said high-density flexible disk drive, said pair of projecting portions laterally outwardly extending from both lateral sides of said case, said case having a first width which includes said projecting portions at said rear portion measuring at least 91 mm, wherein the projecting portions include first and second surfaces, wherein the first and second surfaces of the large-capacity flexible disk are contiguous with the first and second surfaces of the projecting portions, and wherein said projecting portions prevent insertion of the large capacity flexible disk into a normal density dedicated flexible disk drive while allowing insertion of the large capacity flexible disk into said high density flexible disk drive.

\* \* \* \* \*